Figure 1:
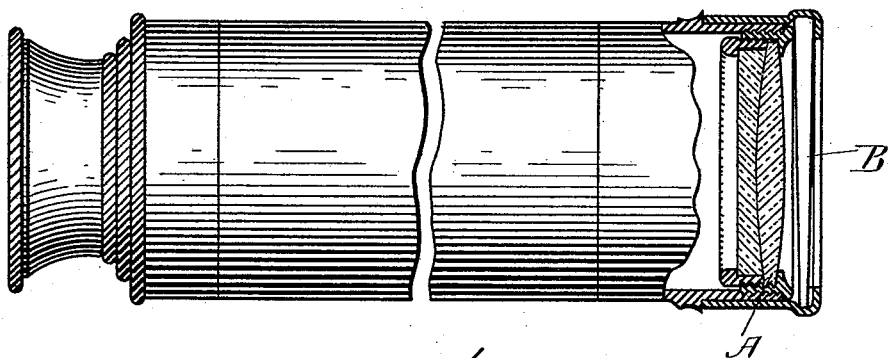

(No Model.) 2 Sheets—Sheet 1.
R. H. RICHARDS.
TELESCOPE.

No. 495,231. Patented Apr. 11, 1893.

WITNESSES
Thurston Hastings
Ellen B. Tomlinson

INVENTOR
Robert H. Richards
by Alex. P. Browne,
attorney.

(No Model.) 2 Sheets—Sheet 2.
R. H. RICHARDS.
TELESCOPE.
No. 495,231. Patented Apr. 11, 1893.
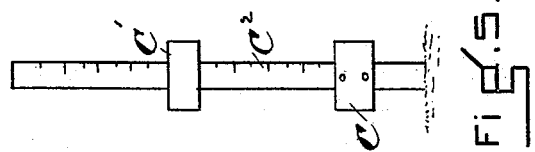
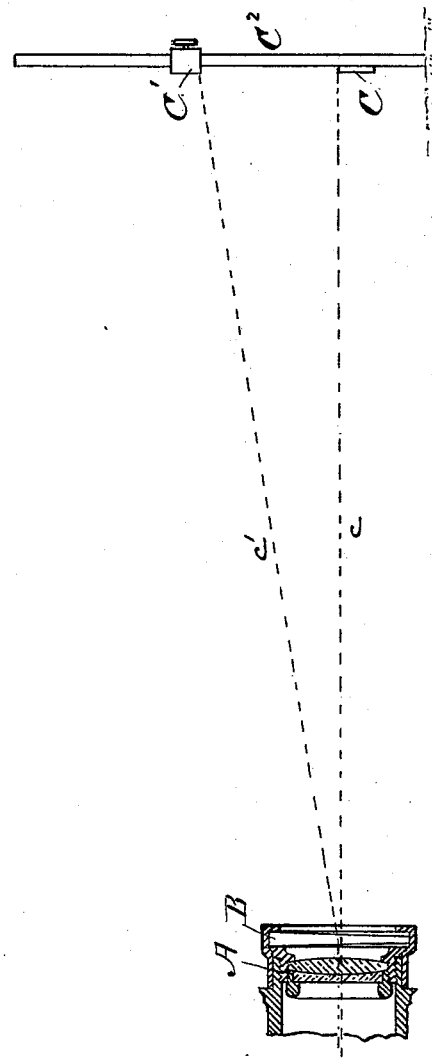
WITNESSES.
Ashton Hastings
Ellen B. Tomlinson.
INVENTOR.
Robert H. Richards
By Alex. P. Browne,
attorney.

UNITED STATES PATENT OFFICE.

ROBERT H. RICHARDS, OF BOSTON, MASSACHUSETTS.

TELESCOPE.

SPECIFICATION forming part of Letters Patent No. 495,231, dated April 11, 1893.

Application filed July 10, 1891. Serial No. 398,999. (No model.)

*To all whom it may concern:*

Be it known that I, ROBERT H. RICHARDS, a citizen of the United States, residing at Boston, in the county of Suffolk and State of Massachusetts, have invented certain new and useful Improvements in Telescopes, of which the following is a specification.

The object of my invention is to provide a telescope by which the distance from the observer to an object observed can be accurately determined, without the use of an artificial support, or of cross-wires.

My improvement consists in adding to the objective of an ordinary telescope, a prism of narrow angle, arranged in advance of the said objective and so as to cover a portion thereof. Such a device is represented in its preferred form in the drawings, wherein—

Figure 2:
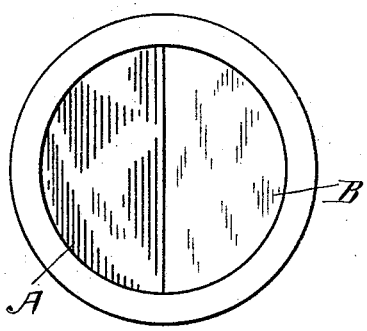
Figure 3:
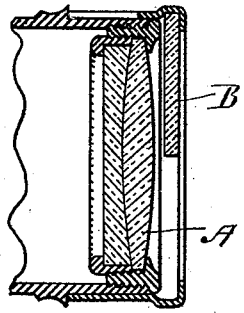

Figure 1 shows the improvement in vertical longitudinal section; Fig. 2 in front elevation, and Fig. 3 in horizontal section. At Fig. 4 is represented in diagram one method of using a telescope provided with my improvement, as will be hereinafter more fully set forth; Fig. 5 being a front view of the mark shown in side view at Fig. 4.

The objective, marked A, may be the ordinary telescopic objective. The prism, marked B, is preferably placed with one of its sides exactly in line with a diameter of the objective (see Fig. 2), so as to equally divide the light, between the direct ray through the objective lens and the bent ray through the prism and lens. The prism should be of a narrow angle, the extent of which will be determined in practice by the range of the telescope. For ordinary stadia measurement, with an objective by which the rod scale can be read up to say, one thousand feet, a prism with an angle of about one degree will give good results.

It is well known that a prism will give a determinable amount of divergence to the image of a distant object. It is also well known that through a telescopic objective alone, we shall obtain an image of the same object without divergence. The observer looking through a telescope provided with my improvement will get separate images of the object observed, one by the direct ray and the other by the bent ray. Now by rotating the telescope, and bring these images in line, if the object be provided with a scale, e. g., the ordinary stadia rod, he can read upon the scale the apparent distance between the images. To illustrate, if the zero point of the rod be marked, the zero points of the images thereof, when brought in line, will be separated by a certain distance, which distance can be at once read upon the scale of the rod, and knowing the amount of deflection of the prism, we know that the observed distance upon the scale between the images will determine the corresponding actual distance between the observer and the rod observed.

My improvement is not confined to use in connection with a stadia rod. For instance, assuming that it is desired to measure the distance from the observer to a mark or target. An assistant standing at the mark moves a second mark toward or away from the first in a direction at right angles to the direct ray until the image of one coming by the bent ray through the prism coincides with the image of the other coming by the direct ray through the objective alone. Then the assistant is signaled to note the distance between the two marks, and this distance like the distance read upon the scale in the case of the rod, will give the distance of the observed mark. This operation is illustrated in diagram at Figs. 4 and 5 where A—B represents the telescope and C the distant mark or target. It being desired to ascertain the distance from the telescope A—B to the target C, an assistant moves a second mark C' toward or away from the target C upon any convenient perpendicular, as for example, a graduated rod $C^2$, until the image of C' coming by the bent ray $c'$ through the prism B coincides with the image of the mark C coming by the direct ray $c$ through the uncovered portion of the objective. When these two images coincide in the eye of the observer, he signals the assistant to note the distance between the marks C and C'. This distance being thus known, and the angle of the prism being known, the observer can readily determine the distance from A—B to the target C, for this is represented by the base line $c$ of a right angle triangle, the altitude $c^2$ of which is known as well as the angle between the rays $c$, $c'$, which is the angle of the prism.

I claim—

A telescope having a portion of its objective covered by a prism and another portion uncovered, whereby the image of one of two objects, simultaneously viewed, may be obtained by a direct ray passing through the uncovered portion, and the image of the other by a ray passing through and bent by the prism for the purpose set forth.

In testimony whereof I have hereunto subscribed my name this 9th day of July, A. D. 1891.

ROBERT H. RICHARDS.

Witnesses:
ELLEN B. TOMLINSON,
JOHN H. TAYLOR.